Dec. 28, 1937.  W. ERNST  2,103,524

GEAR PUMP

Filed Jan. 3, 1935

INVENTOR
WALTER ERNST.
BY
Toulmin & Toulmin
ATTORNEYS

Patented Dec. 28, 1937

2,103,524

UNITED STATES PATENT OFFICE 2,103,524

GEAR PUMP

Walter Ernst, Mount Gilead, Ohio, assignor, by mesne assignments, to The Hydraulic Press Corporation, Inc., Wilmington, Del., a corporation of Delaware Application January 3, 1935, Serial No. 262

1 Claim. (Cl. 103—126)

My invention relates to gear pumps.

It is the object of my invention to provide a gear pump which will maintain the gears centered between the wear plates with extreme accuracy to prevent the scraping on the plates or scraping on the housing and possible seizing.

It is a further object to provide such an accurate alignment of the gears that the extremely close clearance of .0005" can be maintained in order to produce a leak-proof pump, capable of exerting very high pressures. This clearance dimension is approximate, but the pump adjustment must be maintained closely in the neighborhood of this clearance.

It is a particular feature of this pump to provide the use of adjustable, tapered roller bearings, and a method of adjusting the bearings and of adjusting the gears in position relative to the wear plates.

It is also an object to provide means to keep the gear tightly centered on the shaft so there is no chance for the pressure to squeeze the fluid between the clearance plate and gears, or force the gear against the opposite plate, which is the present shortcoming of gear pumps now known in the art.

It is a further object to provide for the adjustability of the pump from the outside to take up the wear on the bearings and to provide for setting up the bearings so tight as to eliminate radial play so that the gear cannot move in either a radial or axial direction, and cannot ride on either the plates or the housing.

Referring to the drawing.

Figure 1:
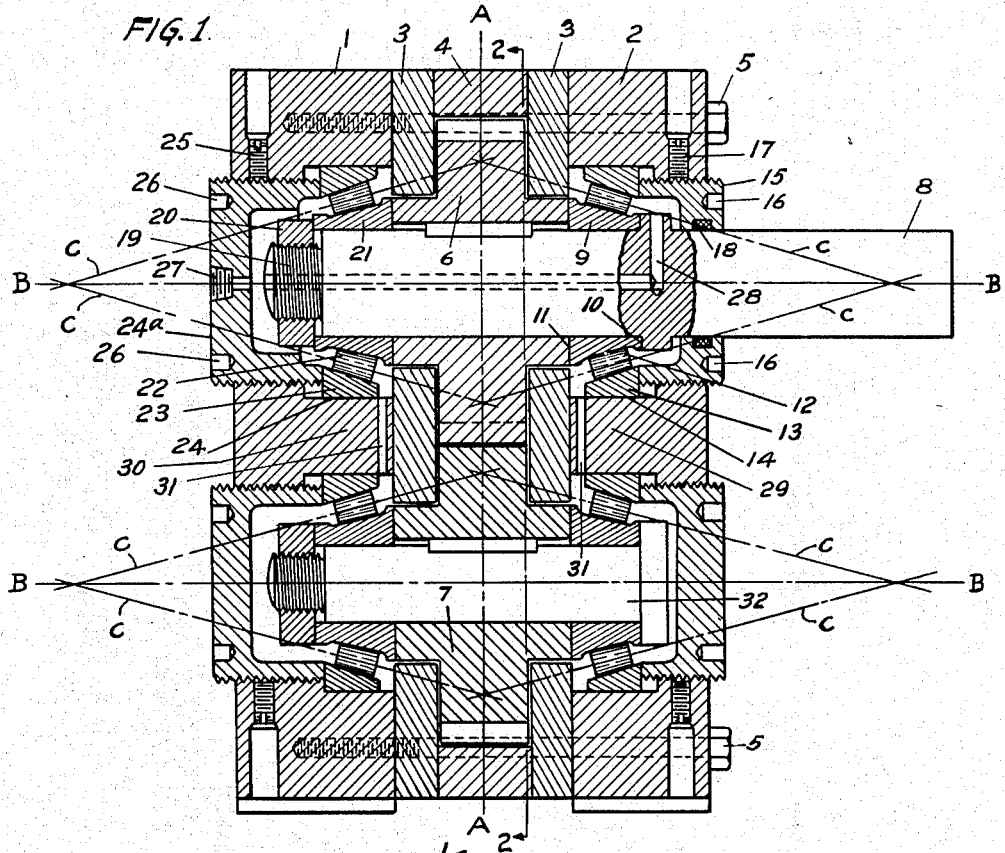
Figure 1 is a vertical section through the pump on the line 1—1, looking in the direction of the arrows, of Figure 2.
Figure 2:
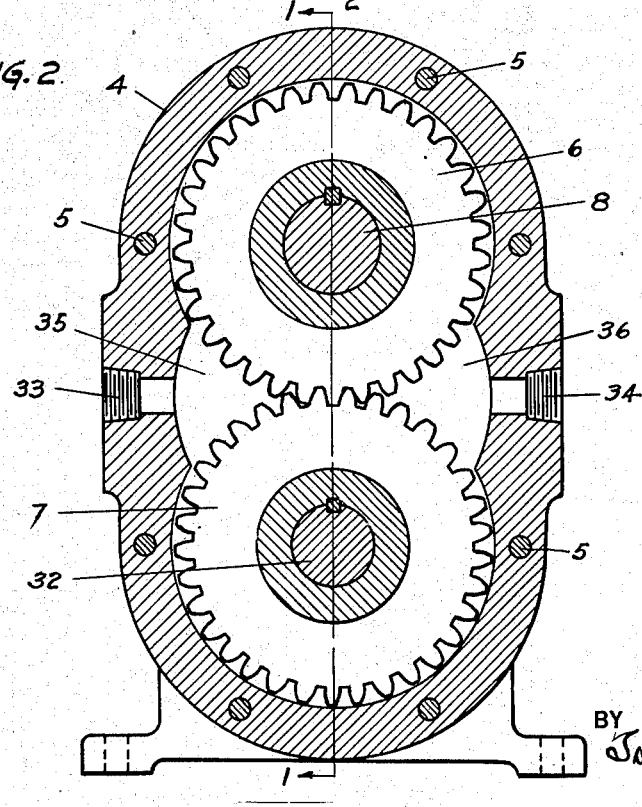
Figure 2 is a section on the line 2—2 of Figure 1, looking in the direction of the arrows.

Referring to the drawing in detail, the numerals 1 and 2 designate the outer sections of the pump housing. The housing is completed by the wear plates 3 and 4. These several members are held together by a plurality of bolts 5. The wear plates 3 and 4 are so arranged as to be spaced from the gears 6 and 7 that the clearance will be in the neighborhood of .0005".

Gear 6 is mounted upon and turns with the driving shaft 8. This driving shaft is mounted on a pair of oppositely disposed tapered roller bearings. The right-hand bearing is provided with an inner race 9, mounted on the shaft 8 between the shoulder 10 and the gear face 11. It is provided with tapered rollers 12 and an outer race 13 which is clamped between the rollers 12, the inner face of the casing half 2, as at 14, and the end of the adjusting nut 15.

The adjusting nut 15 is threaded within the casing half 2 and can be adjusted around the shaft 8 from the outside by the insertion of a tool in the recesses 16. It is prevented from turning when once adjusted by the set screw 17, mounted in the casing half 2. It is also provided with a packing 18 to seal its engagement with the shaft 8.

The other end of the shaft 8 is provided with a threaded end 19 carrying a nut 20, which retains the inner race 21 between it and the adjacent side face of the gear 6. Rollers 22 are mounted on the inner race of this tapered roller bearing. Mounted upon this series of rollers 22 is an outer race 23 which engages the inside wall 24 of that part of the casing designated 1. This outer race is also engaged by the threaded adjusting nut 24a, which is retained in position by the set screw 25 in the casing half 1. This adjusting nut has recesses 26 for the reception of an adjusting tool. It is provided with a leakage drain 27. The shaft 8 is provided with a bent disposed passageway 28 from one side of the gear to the other.

The casing halves 1 and 2 have interiorly disposed ribs 29 and 30, which engage with the inner portions of the wear plates 3, which are oppositely disposed on either side of the gears 6 and 7, where those gears mesh. Here again the clearance is maintained as indicated. These internally extending portions 29 and 30 are provided with a passageway 31. The gear 7 is mounted on the stub shaft 32, which is mounted in the same manner as the shaft 8. The only difference is that the shaft 32 does not extend outside of the casing.

The pump is provided with an inlet or suction port 33 and an outlet or discharge port 34. The numeral 35 designates the inlet chamber and 36 the outlet chamber.

Operation

It will be observed that the two shafts are mounted upon tapered roller bearings, axial lines through which meet in a center plane vertically disposed through the gears, and the other ends of which meet in the axial line of the shaft supported by the bearings. This plane through the gears is marked AA, and the axial line of the shaft is marked BB, and the radial axial lines of the roller bearings are marked C. Thus a very accurately balanced construction is provided.

The nut 20 holds the entire bearing assembly in position on the shaft, while the adjusting collars 15 and 24a make possible the simultaneous adjustment of the diametral clearances of the tapered roller bearings 22 and the lateral positions of the shaft, bearings and gear relatively to the wear plates 3. By this means the clearance between the wear plates 3 and the gear 6 can be maintained with extreme accuracy in the neighborhood of .0005", which produces a leak-proof pump capable of exerting high pressures.

It will be understood that I desire to comprehend within my invention such modifications as come within the scope of my claims and my invention.

It will be understood that when the term "wear plate" is referred to in the specification and claim, I am referring to any part of the casing which is adjacent to the gears. These wear plates are in fact a misnomer in that they are not engaged by the gears and are therefore not subject to wear, but this is the conventional term for that portion of the casing which is adjacent to the gears and as to which a predetermined close spacing must be maintained. The wear plates may be separate from the casing or a part of it. It will therefore be understood that while I have used the language customary in this art, it is done so with the understanding of its meaning in this art. The expression "housing plate" instead of "wear plate" is a more accurate designation, but not one customarily employed in this art.

Having thus fully described my invention, what I claim as new and desire to secure by Letters Patent, is:

In combination in a gear pump, a pair of spaced shafts, pumping gears mounted on said shafts, at least one of said shafts having an annular shoulder located inwardly of the end of the shaft and a threaded portion upon said end with a nut engaging said thread, tapered roller bearings mounted on said shaft on opposite sides of said gear, the inner races of said bearings being arranged between said gear and shoulder and nut, respectively, and in abutment therewith, said bearings, and their inner races together with the gear being assembled or disassembled as an entirety from the said end of the shaft beyond said shoulder and all of said parts being clamped to the shaft by said nut when it is in engagement with the threaded end of the shaft, a casing for said pump adapted to slidably support the outer races of said bearings, and adjustable collars in said casing adapted to engage said bearings for adjustably moving the bearings and the shaft with its gear axially of said shaft to simultaneously adjust the intervals between said gear and said casing and also to reduce the diametral clearances of said tapered roller bearings.

WALTER ERNST.